United States Patent
Iwasaki et al.

[11] Patent Number: 5,848,037
[45] Date of Patent: Dec. 8, 1998

[54] DATA RECORDING MEDIUM AND DATA RECORDING APPARATUS FOR RECORDING IDENTIFICATION SIGNAL ON THE DATA RECORDING MEDIUM

[75] Inventors: Yasuo Iwasaki; Nobuhiro Chiba; Kazumichi Hatate, all of Kanagawa, Japan

[73] Assignee: Sony Corporation, Tokyo, Japan

[21] Appl. No.: 627,140

[22] Filed: Apr. 3, 1996

[30] Foreign Application Priority Data

Apr. 7, 1995 [JP] Japan ................................. 7-107034

[51] Int. Cl.[6] .................................................. G11B 7/00
[52] U.S. Cl. .................................................. 369/47; 360/48
[58] Field of Search ............................ 369/59, 47, 48, 369/58, 32, 275.1, 275.3, 275.4, 100, 124; 360/48

[56] References Cited

U.S. PATENT DOCUMENTS

| | | |
|---|---|---|
| 5,448,544 | 9/1995 | Tsuchinaga et al. ................. 369/59 |
| 5,475,662 | 12/1995 | Miyagawa et al. ................. 369/44.26 |
| 5,616,390 | 4/1997 | Miyagawa et al. ................. 369/275.4 |

*Primary Examiner*—Thang V. Tran
*Attorney, Agent, or Firm*—Limbach & Limbach L.L.P.

[57] ABSTRACT

A part of the reference signal used as the reference in recording and reproduction is recorded with the polarity thereof being inverted in a data recording medium or in a data recording apparatus in order to positively reproduce recorded data with a simple configuration. When identification signal NRZI for each sector is repeatedly recorded, for example, a part of this identification signal is recorded with the polarity thereof being inverted.

9 Claims, 8 Drawing Sheets

TRACK NUMBER : 2222   ID NUMBER : 0   SECTOR NUMBER : 22   CRC : 10683

DATA : 0000100010101110001011000101101101110000000
RLL  : 0100100100010010100000101010000101001001000001001010010
NRZI : 14
DSV  : 0111000111100111100111111001111100011111100011100

FIG. 5B

TRACK NUMBER : 2222   ID NUMBER : 1   SECTOR NUMBER : 22   CRC : 24959

DATA : 000010001010111001011011001100000101111110000000
RLL  : 010010010001010010100000010010101001010010010001010010010
NRZI : 
DSV  : 0111000111100111110001110000011111100111000110011100011
      : 6

FIG. 5C

TRACK NUMBER : 2222   ID NUMBER : 2   SECTOR NUMBER : 22   CRC : 47155

DATA : 0100100100010101000010000001000000101010101010010010
RLL  : 0000100010101110010101111000011100010000000
NRZI : 0111000111100111110011101111100001001100011001110011
DSV  : 2

FIG. 6A

```
TRACK NUMBER : 2222    ID NUMBER : 0    SECTOR NUMBER : 22    CRC : 10683
DATA  : 0000100010101110001011000101011011101100000000
RLL   : 0100100100101000010100001010010000100100001010010010
NRZI  : 0111000111100111110011110011111100011111100000111111100011100
DSV   : 14
```

FIG. 6B

```
TRACK NUMBER : 2222    ID NUMBER : 1    SECTOR NUMBER : 22    CRC : 24959
DATA  : 0000100010101110001011000101011011111110000000
RLL   : 0100100100101000010100001010010000100100001010010010
NRZI  : 1000111000111000110000000110000111110000000111111001110011100
DSV   : -6
```

FIG. 6C

```
TRACK NUMBER : 2222    ID NUMBER : 2    SECTOR NUMBER : 22    CRC : 47155
DATA  : 0000100010101110101001011101011100000110011000000
RLL   : 0100100100101000010100001010010000100100001010010010
NRZI  : 0111000111100111110001111100000011000000011100110011100011
DSV   : 2
```

DATA RECORDING MEDIUM AND DATA RECORDING APPARATUS FOR RECORDING IDENTIFICATION SIGNAL ON THE DATA RECORDING MEDIUM

BACKGROUND OF THE INVENTION

1. Field of the Invention

The present invention relates to data recording media and data recording apparatuses. For example, the invention relates to a magneto-optical disk for enabling recorded data to be positively reproduced with a simple configuration by recording a part of identification signals with the polarity thereof being inverted in recording the identification signals for each sector repeatedly.

2. Description of the Related Art

In a conventional optical-disk apparatus, identification signals are recorded on a magneto-optical disk in advance by preformatting, and recording and reproduction are performed with the identification signals being used as the references.

In a magneto-optical disk which is an information recording medium used in such an optical-disk apparatus, an information recording surface is divided radially to form sectors, and identification signals indicating track numbers and sector numbers are recorded at the tops of the sectors with pits in advance in preformatting.

The optical-disk apparatus receives the light returned from the magneto-optical disk to which a laser beam is emitted, and generates a reproduction signal which varies the signal level according to changes in the amount of the returned light. Then, the apparatus extracts an AC component from the reproduction signal by AC coupling, binarizes the AC component with a slice level of the zero level being used as the reference, and demodulates the identification signal from the resultant binarized signal.

With this method, the optical-disk apparatus detects a track number, a sector number, and other data. In record mode for recording information into a magneto-optical disk, the apparatus intermittently controls the light amount of the laser beam such that it reaches the amount for writing from that for reading at the desired sector, applies the specified magnetic field at the position where the laser beam is to be emitted, and records the desired data into the desired sector with the use of the thermal magnetic recording method.

In reproduction mode for reproducing information stored in a magneto-optical disk, the optical-disk apparatus detects the desired sector using an identification signal as the reference, and generates the reproduction data from the reproduction signal varying its signal level according to the plane of polarization in the light returned from the sector. The apparatus uses an identification signal as the reference to detect the desired sector also in reproduction mode, and reproduces the data stored in the sector with the use of the magnetic Kerr effect.

An optical-disk apparatus of this type extracts an AC component from a reproduction signal, then generates the binarized signal with the reference of the zero level, and demodulates the identification signal. If a reproduction signal changes its DC level, the identification signal cannot be reproduced positively and easily.

When the DC level of a reproduction signal varies, this DC level change is extracted together with the AC component in extracting the AC component from the reproduction signal. Therefore, when the AC component is binarized with a fixed slice level, it is difficult with the resultant binarized signal to have a rising edge at the correct timing, which thereby generates a jitter in the clock to be generated from the binarized signal. This reduces the phase margin in demodulating a reproduction signal and the identification signal cannot be reproduced positively. When the phase margin is reduced, it becomes difficult to increase recording density.

To solve this problem, a method for changing the slice level used for generating a binarized signal according to a change in the DC level can be used. In that case, however, the configuration of the optical-disk apparatus becomes complicated.

SUMMARY OF THE INVENTION

Accordingly, it is an object of the present invention to provide a data recording medium and a data recording apparatus which enable the identification signals, which are the references for recording and reproduction, formed in preformatting to be reproduced easily and positively.

The above object of the present invention is achieved through the provision of a data recording medium in which an area for recording data is divided into sub-areas in preformatting; and in each divided sub-area, an identification-signal recording region for recording an identification signal identifying the divided sub-area is formed and the identification signal is recorded in the preformatting in the identification-signal recording region in a plurality of times of repeated recording, and a region other than the identification-signal recording region is formed in the divided sub-area such that the data is recorded or reproduced; the data recording medium having, in the identification-signal recording region, an inversion-recording zone wherein the identification signal is recorded with the polarity thereof being inverted in at least one of the plurality of times of repeated recording in order to reduce the sum of the DC levels of identification signals recorded in the plurality of times of repeated recording.

The above object of the present invention is also achieved through the provision of a data recording apparatus which divides an area for recording data in a data recording medium into sub-areas in preformatting; and in each divided sub-area, forms an identification-signal recording region for recording an identification signal identifying the divided sub-area and records the identification signal in the preformatting in the identification-signal recording region in a plurality of times of repeated recording, the data recording apparatus comprising: signal generation means for generating at least a signal indicating the start of the divided sub-area, the identification signal, and a signal forming a clock for reproducing the identification signal; signal arrangement means for arranging the outputs of the signal generation means in the order of recording the outputs into the data recording medium; signal modulation means for modulating the output of the signal arrangement means to a signal suited for recording to the data recording medium; polarity-inversion means for receiving the output of the signal modulation means and for selectively inverting the polarity of an identification signal to be recorded, in at least one of the plurality of times of repeated recording according to a control signal in order to reduce the sum of the DC levels of identification signals recorded in the plurality of times of repeated recording; recording means for recording the output of the polarity-inversion means into the data recording medium; and control means for controlling the signal generation means and the signal arrangement means, and for forming a control signal which controls the polarity-inversion means.

DETAILED DESCRIPTION OF THE PREFERRED EMBODIMENTS

Embodiments of the present invention will be described below by referring to the drawings.

The configuration of an embodiment will be described below first.

Figure 2:
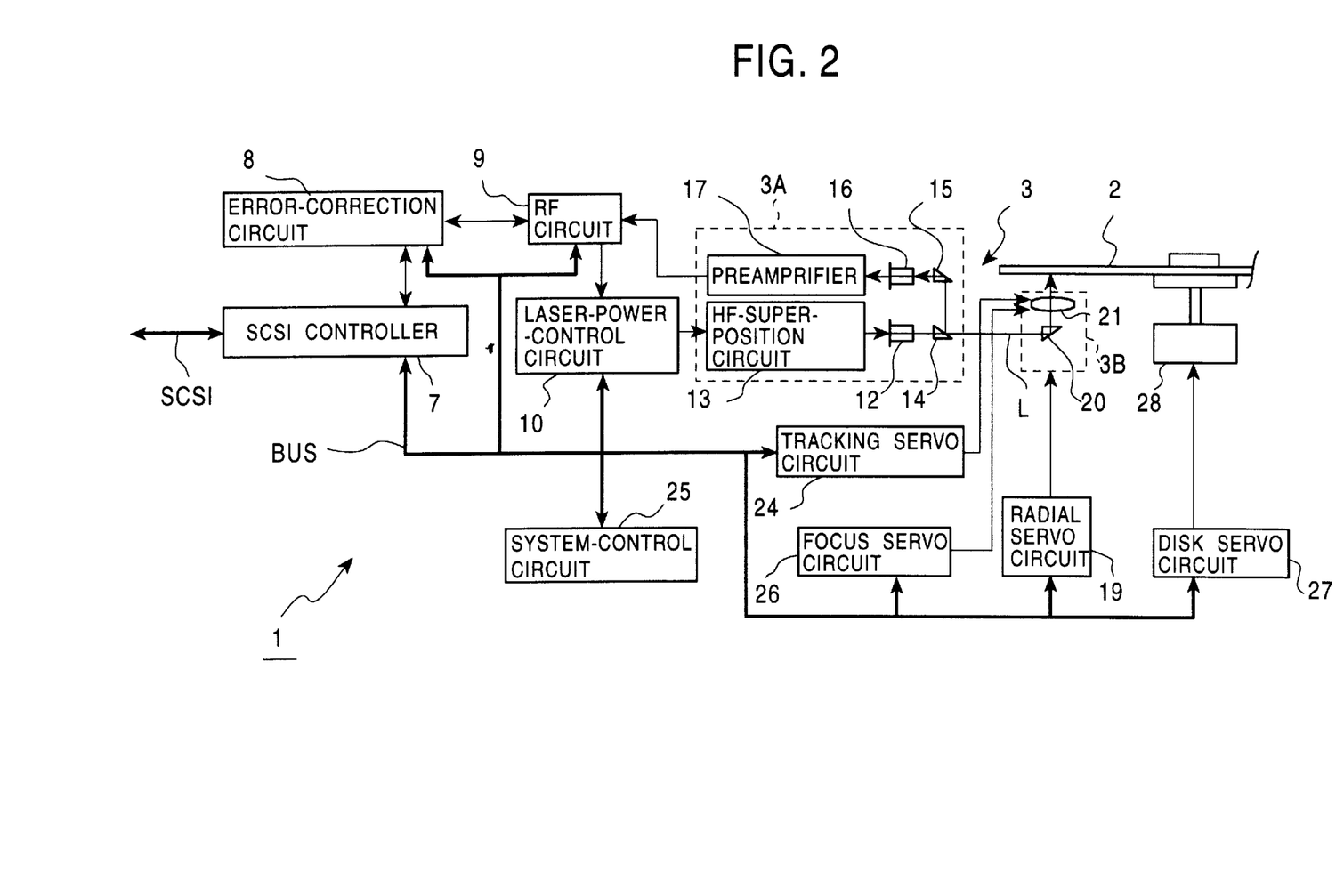
FIG. 2 is a block diagram showing an optical-disk apparatus according to an embodiment of the present invention.

FIG. 2 is a block diagram showing an optical-disk apparatus according to an embodiment of the present invention. The optical-disk apparatus 1 records image data into a magneto-optical disk 2, and reproduces and outputs the image data stored in the magneto-optical disk 2.

The optical-disk apparatus 1 is connected to an external device with a small computer system interface (SCSI) via a SCSI controller 7, and switches operations according to a control command input from the external device. The SCSI controller 7 outputs a control command input from the external device to an internal bus (BUS) and outputs to the external device an acknowledge command input through the internal bus (BUS). The SCSI controller 7 also outputs image data input from the external device to an error-correction circuit 8 in record mode for recording image data into the magneto-optical disk 2, and outputs to the external device image data input from the error-correction circuit 8 in reproduction mode for reproducing image data from the magneto-optical disk 2.

The error-correction circuit 8 adds error-correction codes and other codes to image data input from the SCSI controller 7, converts it to the data having the specified data configuration, applies 1–7 coding processing to generate coded data, and outputs the coded data to the RF circuit 9 in record mode. By contrast, in reproduction mode, the error-correction circuit 8 converts coded data input from the RF circuit 9 to the data having the original data configuration, which is the reverse operation in recording, executes the specified data processing including error-correction, thereby reproduces image data stored in the magneto-optical disk 2, and outputs the data to the SCSI controller 7.

The RF circuit 9 outputs to a laser-power-control circuit 10 the detected amount of returned light obtained from receiving the returned light at the corresponding optical block 3. The RF circuit 9 also detects sector marks and other marks stored in the magneto-optical disk 2 in advance in preformatting from receiving the returned light, and detects the record timing and the reproduction timing. In record mode, the RF circuit 9 applies non-return-to-zero-inverted (NRZI) modulation to coded data input from the error-correction circuit 8 to generate the modulated signal, and outputs the modulated signal to the laser-power-control circuit 10 with the timing detected with the center marks and other marks being used as the references.

In reproduction mode, the RF circuit 9 inputs reproduction signal RF obtained from the corresponding optical block 3, applies NRZI demodulation to reproduction signal RF with the reproduction clock generated from the reproduction signal RF to form the reproduction data, and outputs the reproduction data to the error-correction circuit 8.

The laser-power-control circuit 10 maintains the light amount of laser beam L emitted from the optical block 3 to the magneto-optical disk 2 at the specified light amount, according to the detected light amount of the returned light input from the RF circuit 9. The laser-power-control circuit 10 also changes the light amount of laser beam L from that for reproduction mode to that in recording intermittently, according to the modulated signal input from the RF circuit 9 via a HF-superposition circuit 13 when image data is recorded into the magneto-optical disk 2.

The optical block 3 comprises a fixed section 3A secured to a chassis and a moving section 3B which moves in the radial direction of the magneto-optical disk 2. The fixed section 3A has a laser diode 12 emitting a laser beam. In record mode, the HF-superposition circuit 13 superposes a high-frequency signal onto a drive signal for the laser diode 12.

The fixed section 3A sends the laser beam L emitted from the laser diode 12, toward the rotational center axis of the magneto-optical disk 2 through the prism 14 to supply laser beam L to the moving section 3B disposed on the optical axis of the emitted light. The fixed section 3A also reflects at the prism 14 the returned light of laser beam L obtained by the moving section 3B and changes its optical path at the prism 15 to receive the light at the specified light-receiving device 16.

The light-receiving device 16 is formed such that it generates a tracking-error signal, a reproduction signal, and other signals from the returned light. The light-receiving device 16 also outputs the results of receiving light at light-receiving surfaces to a preamplifier 17. At the preamplifier 17, the fixed section 3A applies voltage-current conversion processing to each output signal from the light-receiving device 16, applies addition and subtraction processing, amplifies at the specified amplification rate, and outputs the signal. With this configuration, the fixed section 3A supplies laser beam L to the moving section 3B, and receives the returned light obtained at the moving section 3B to generate reproduction signal RF, a tracking-error signal, a focus-error signal, and other signals.

By contrast, the moving section 3B is formed such that it is driven by a radial servo circuit 19 and moves in the radial direction of the magneto-optical disk 2 from the specified retraction position. The moving section 3B changes the optical path of laser beam L supplied from the fixed section 3A and converges the beam on an information-recording surface of the magneto-optical disk 2 with an objective lens 21. The moving section 3B also converges the returned light of laser beam L obtained from the information-recording surface with the objective lens 21, changes the light path at the prism 20, and emits the light to the fixed section 3A.

In the moving section 3B, the objective lens 21 is formed such that it moves left and right, and up and down by a drive signal. A tracking servo circuit 24 starts operations under the control of a system-control circuit 25, moving the objective lens 21 left and right according to a tracking-error signal, thereby performing tracking-control for the optical block 3.

A focus servo circuit 26 starts operations under the control of the system-control circuit 25 in the same way, moving the objective lens 21 up and down according to a focus-error signal, thereby performing focus-control for the optical block 3.

A disk servo circuit 27 rotates a spindle motor 28 which rotates the magneto-optical disk 2 chucked to the rotation axis of the spindle motor 28 at a constant angular velocity.

RF Circuit

Figure 3:
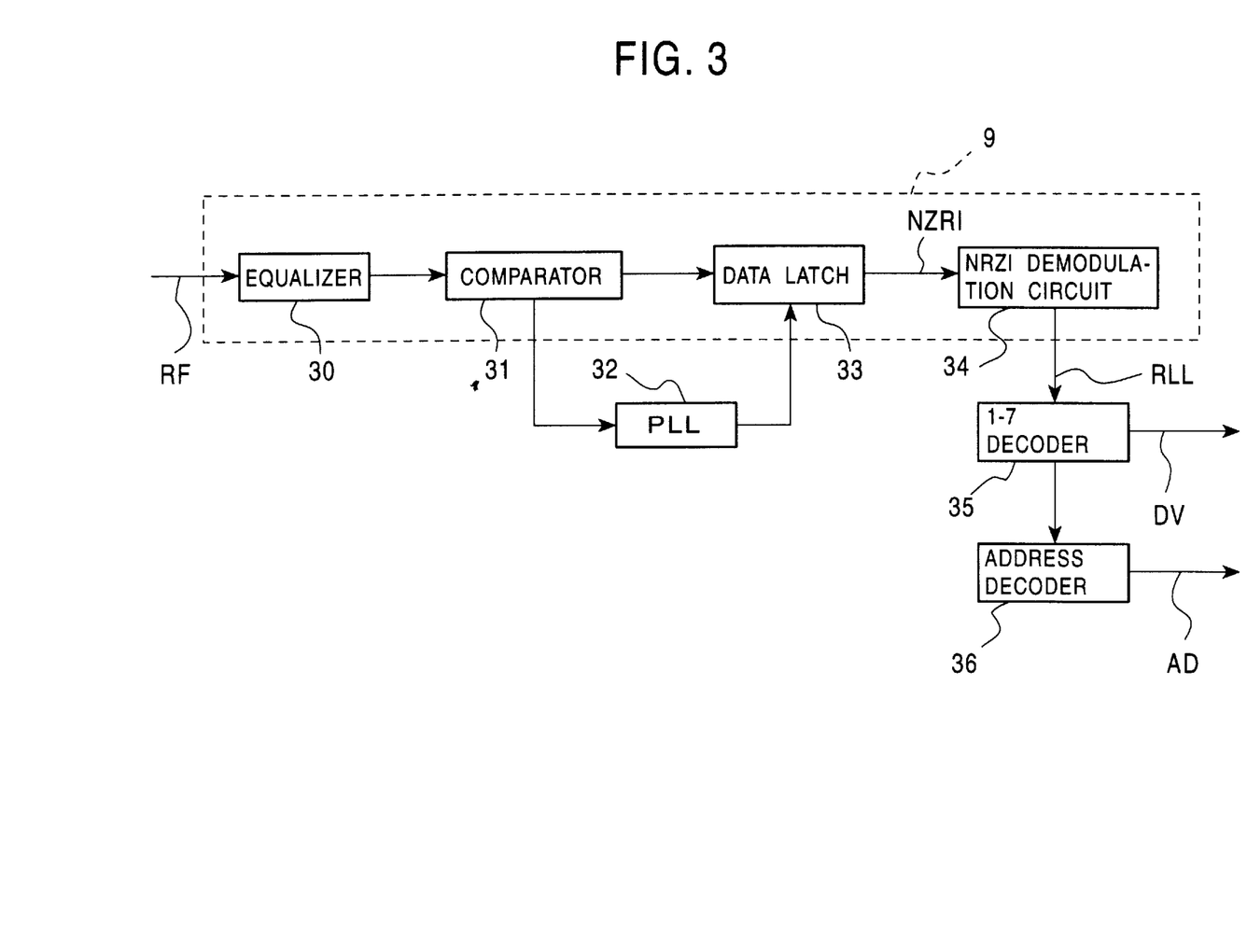
FIG. 3 is a block diagram illustrating the RF circuit of the optical-disk apparatus shown in FIG. 2.

FIG. 3 is a block diagram showing a reproduction system in an RF circuit 9. In reproduction, the RF circuit 9 inputs reproduction signal RF output from the optical block 3 to an equalizer 30 and compensates for the frequency characteristics.

A comparator 31 comprises a comparison circuit in which a slice level is set to the zero level. The comparator receives the reproduction signal RF output from the equalizer 30 with AC coupling, binarizes the signal at the slice level, and outputs the resultant binarized signal. If the DC level of the reproduction signal RF varies, the edge timing of the binarized signal changes in this binarizing process.

A PLL circuit 32 receives the binarized signal at the specified timing and generates reproduction clocks with the edges of the received binarized signal being used as the references, thereby generating the reproduction signal with the reference signals stored in advance in the magneto-electric disk 2, namely the preformatted reference signals, being used as the reference. If the binarized signal is not binarized at the correct timing, a jitter occurs in the reproduction clocks, reducing the phase margin in the whole optical-disk apparatus 1.

A data latch circuit 33 latches the binarized signal output from the comparator 31 with a reproduction clock and outputs reproduction data NRZI. An NRZI demodulation circuit 34 performs NRZI demodulation for the reproduction data NRZI and outputs the data. A 1–7 decoder 35 performs 1–7 demodulation for the data output from the NRZI demodulation circuit and outputs the result. With this configuration, in the optical-disk apparatus 1, image data DV to which an error-correction code is added is demodulated through the 1–7 decoder 35.

An address decoder 36 takes the output data of the 1–7 decoder 35 at the specified timing to receive identification signals such as track numbers and sector numbers, and detects errors with cyclic redundancy check (CRC) data added to the signals. The address decoder 36 also converts these signals to the specified address data AD, and outputs the data to the system-control circuit 25. With this configuration, in the optical-disk apparatus 1, the system-control circuit 25 controls the operations of the whole apparatus to record image data at the desired sector and to reproduce image data from the desired sector.

Configuration of the Magneto-Optical Disk

Figure 4:
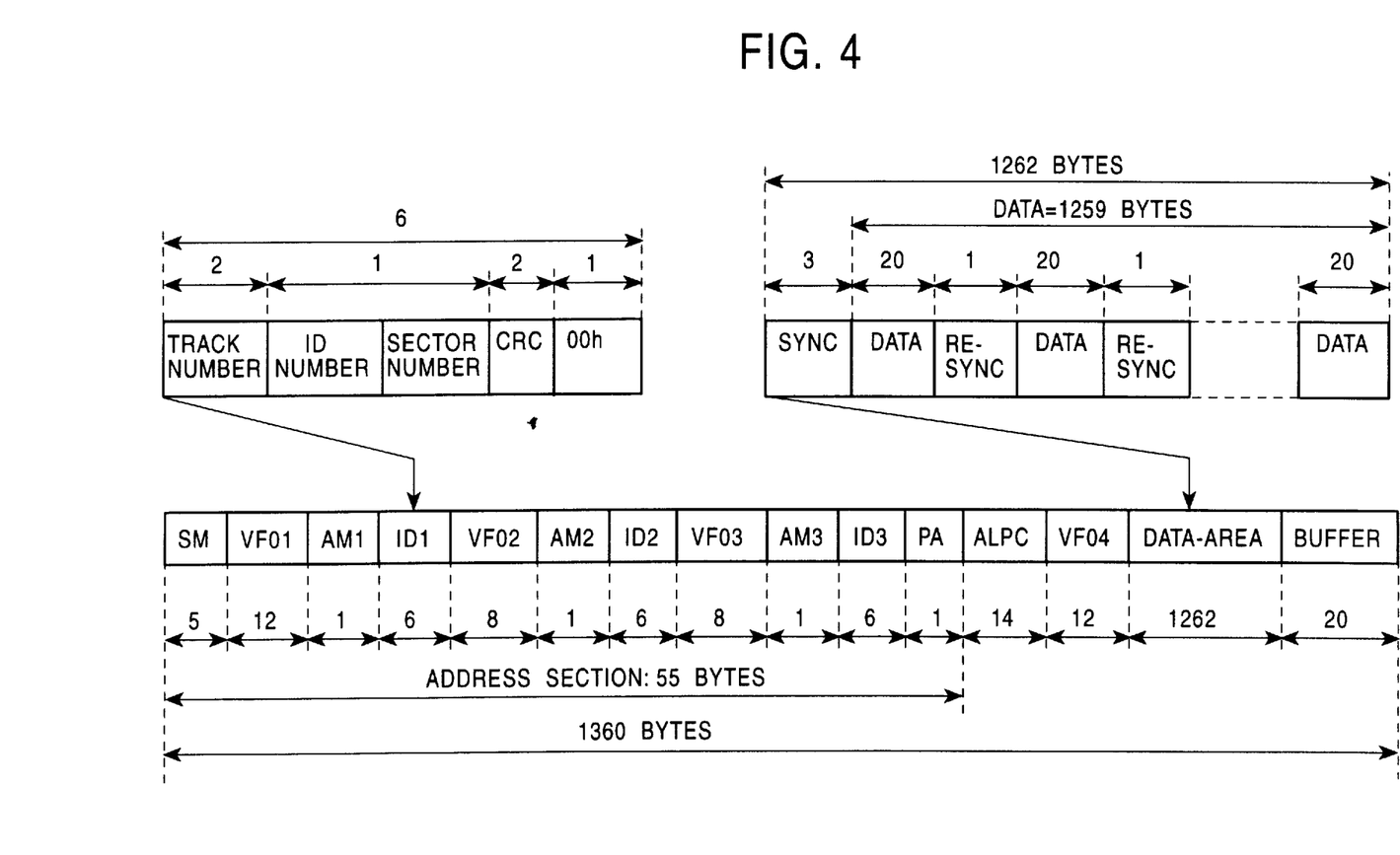
FIG. 4 is a view showing the format of each section in the magneto-optical disk shown in FIG. 1.

An information-recording surface of the magneto-optical disk 2 is equally divided into 42 sectors in total in preformatting, each of which is specified as shown in FIG. 4. In each sector, an address section having 55 bytes is formed at the top of the sector in advance in preformatting, and the rest is assigned to a user area. Data having the specified format can be recorded in the user area.

In this address section, a sector mark (SM) is recorded at the top and a postamble (PA) is recorded at the end. The sector mark indicates the start of an address section and the postamble indicates the end of the address section.

In the rest of the address section, address marks (AM1, AM2, and AM3), ID signals (ID1, ID2, and ID3), and the reference signals (VFO1, VFO2, and VFO3) are sequentially and cyclically recorded three times, assuring reliability. An address mark indicates the start position for recording the corresponding ID signal. With the reference signals, reproduction clocks used in recording and reproduction are generated in the PLL circuit 32.

An ID signal serving as an identification signal is recorded after adding CRC data and data 00h to a track number, an ID number, and a sector number, performing 1–7 modulation, and NRZI demodulation. In the magneto-optical disk 2, with this ID signal, the address indicating the recording and reproduction position is detected.

As described above, the optical-disk apparatus 1 detects the start position of a sector according to the sector mark, and checks a recording and reproduction position with an ID signal. When a postamble is detected at the sector, recording and reproduction processing is executed for the succeeding user area.

The user area comprises a trial-writing area (ALPC), a reference-signal recording area (VFO4), a data recording area (DATA-AREA), and a buffer area (BUFFER). In the trial-writing area, data is trial-written with the laser power being controlled to adjust the light amount in writing. The data clock is recorded in the reference-signal recording area. The buffer area is a blank area.

In the data recording area, a synchronization pattern area (SYNC) in which the specified synchronization pattern is recorded is followed by record areas (DATA) in which the specified bytes of data are recorded together with the error-correction codes and resync areas (RESYNC) alternately formed.

ID Signals

As described above, signals stored in the magneto-optical disk 2 in advance in preformattting other than ID signals are formed in repeated patterns. For those signals, the DC level of a reproduction signal is maintained at the zero level in the optical-disk apparatus 1.

In an ID signal, six-bytes of data to which modulation processing has been applied as described above is recorded. The upper and lower bytes of a track number are assigned to the first two bytes of the six bytes. In this embodiment, recording tracks are spirally formed on the information recording surface, and consecutive track numbers are assigned to tracks from the most inner peripheral track in units of one turn.

An ID number is assigned to bits 6 and 7 of the subsequent byte. Value 00 indicates the first ID signal (ID1), value 01 indicates the second ID signal (ID2), and value 02 indicates the third ID signal (ID3). A sector number is assigned to the rest of the byte. Since the magneto-optical disk 2 comprises 42 sectors, the remaining bits indicate sectors 0 to 41. The 16-bit CRC data calculated from the first to third bytes is assigned to the further subsequent two bytes, and the fixed value, 00h, is assigned to the last one byte.

Figure 5A:
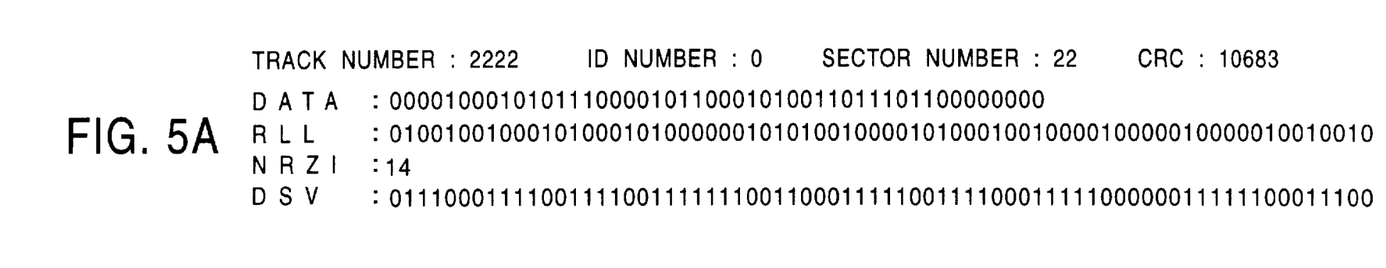
FIGS. 5A–5C are views illustrating examples of the ID signals shown in FIG. 4.
Figure 5B:
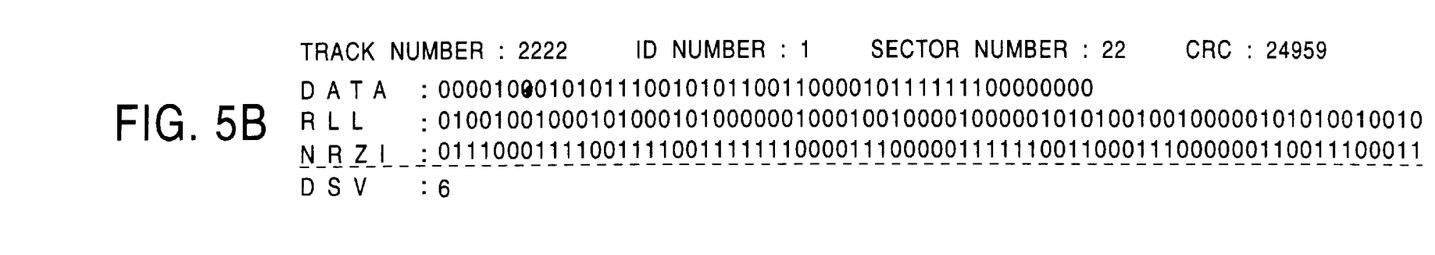
Figure 5C:
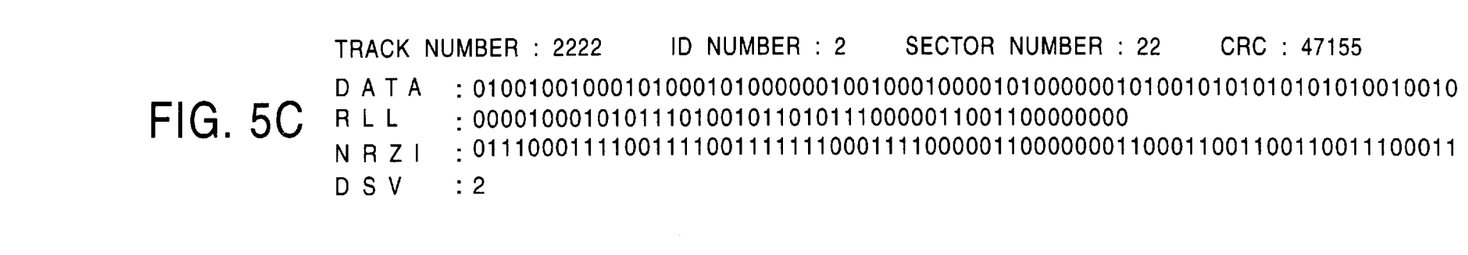

As shown in FIGS. 5A, 5B, and 5C, an ID signal is formed by generating a data string (DATA) corresponding to the track number, the ID number and the sector number, converting to the modulation data (RLL) by performing 1–7 modulation to the data string, and performing NRZI modulation to obtain the resultant data string (NRZI).

The data string (NRZI) generated as described above changes according to the track number, the ID number, and the sector number. When the string is recorded as is as an ID signal, it is difficult to maintain the DC level at the zero level unlike that of the sector-mark signal. Depending on the track number, the ID number, and the sector number, namely, depending on the sector position, the DC level changes.

In the sector having a track number of 2222 and a sector number of 22 shown in FIG. 5, the digital sum value (DSV), which is one of the parameters for evaluating the DC level, is 14 for ID number 0, 6 for ID number 1, and 2 for ID number 2.

Figure 6A:
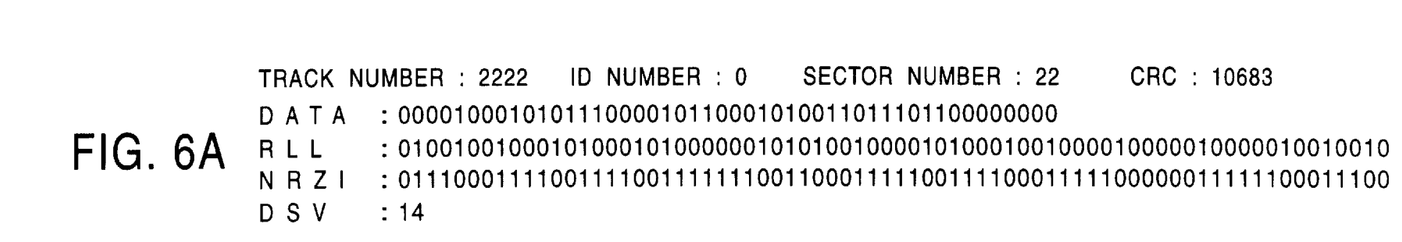
FIGS. 6A–6C are views illustrating actual ID signals compared with those shown in FIG. 5.
Figure 6B:
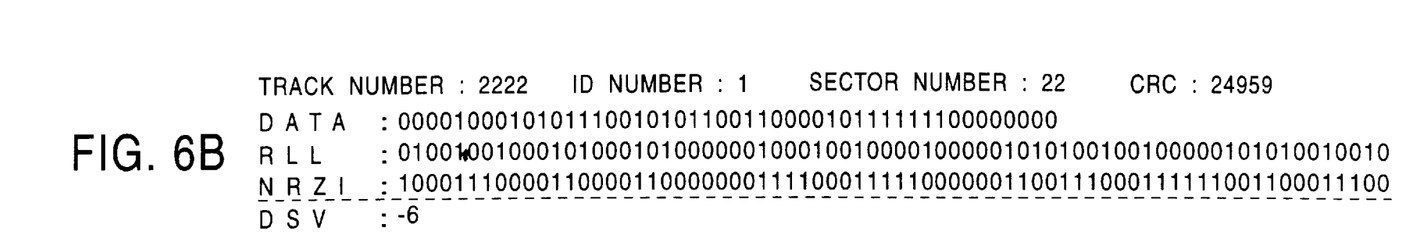
Figure 6C:
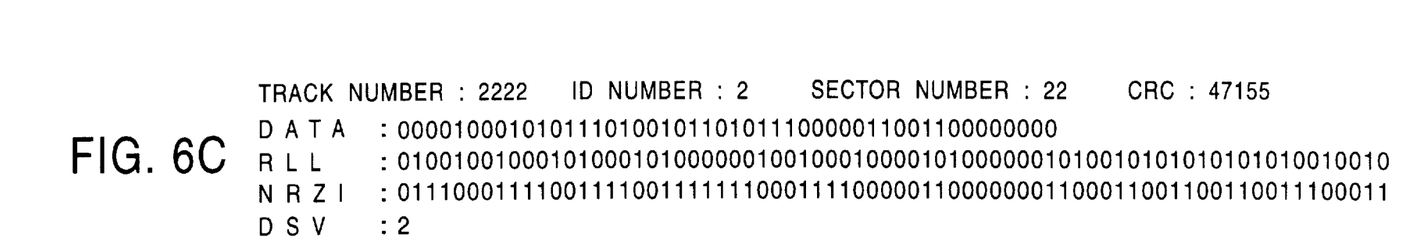

In this embodiment, among the data strings (NRZI) obtained as described above, data strings having ID numbers of 0 and 2 are stored in the magneto-optical disk 2 as is as ID signals as shown in FIGS. 6A and 6C, and a data string having an ID number of 1 is stored with the signal level being inverted as shown in FIG. 6B.

Whereas a DSV of 22 (14+6+2) is obtained in the whole ID signals in the example shown in FIG. 5, the DSV can be reduced to 10 (14−6+2) in the embodiment as shown in FIG. 6. This means that the DC level of the reproduction signal can approach the zero level for the ID signals by the reduced amount.

Figure 7:
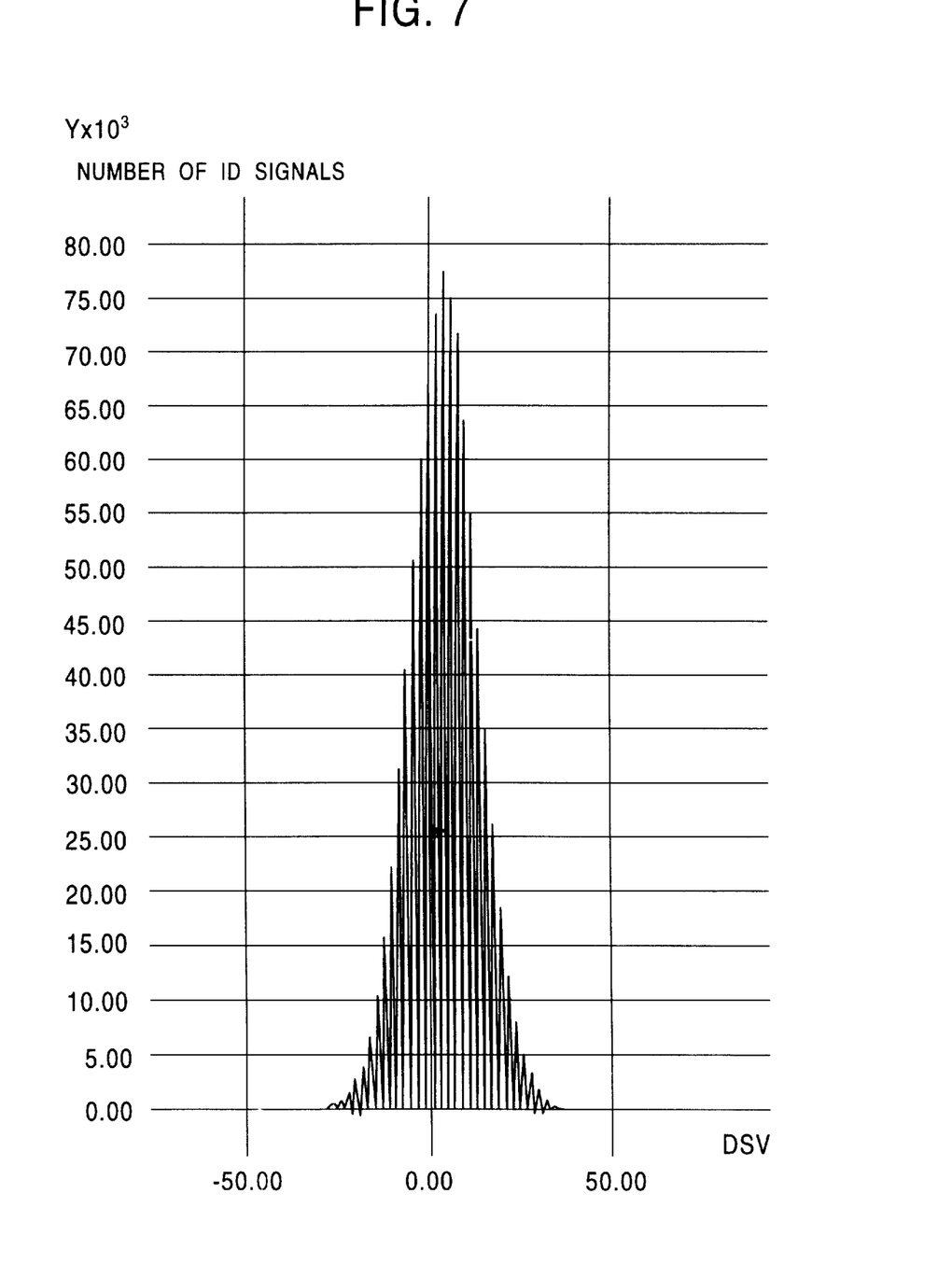
FIG. 7 is a characteristics curve showing the distribution of DSV in the whole magneto-optical disk.
Figure 8:
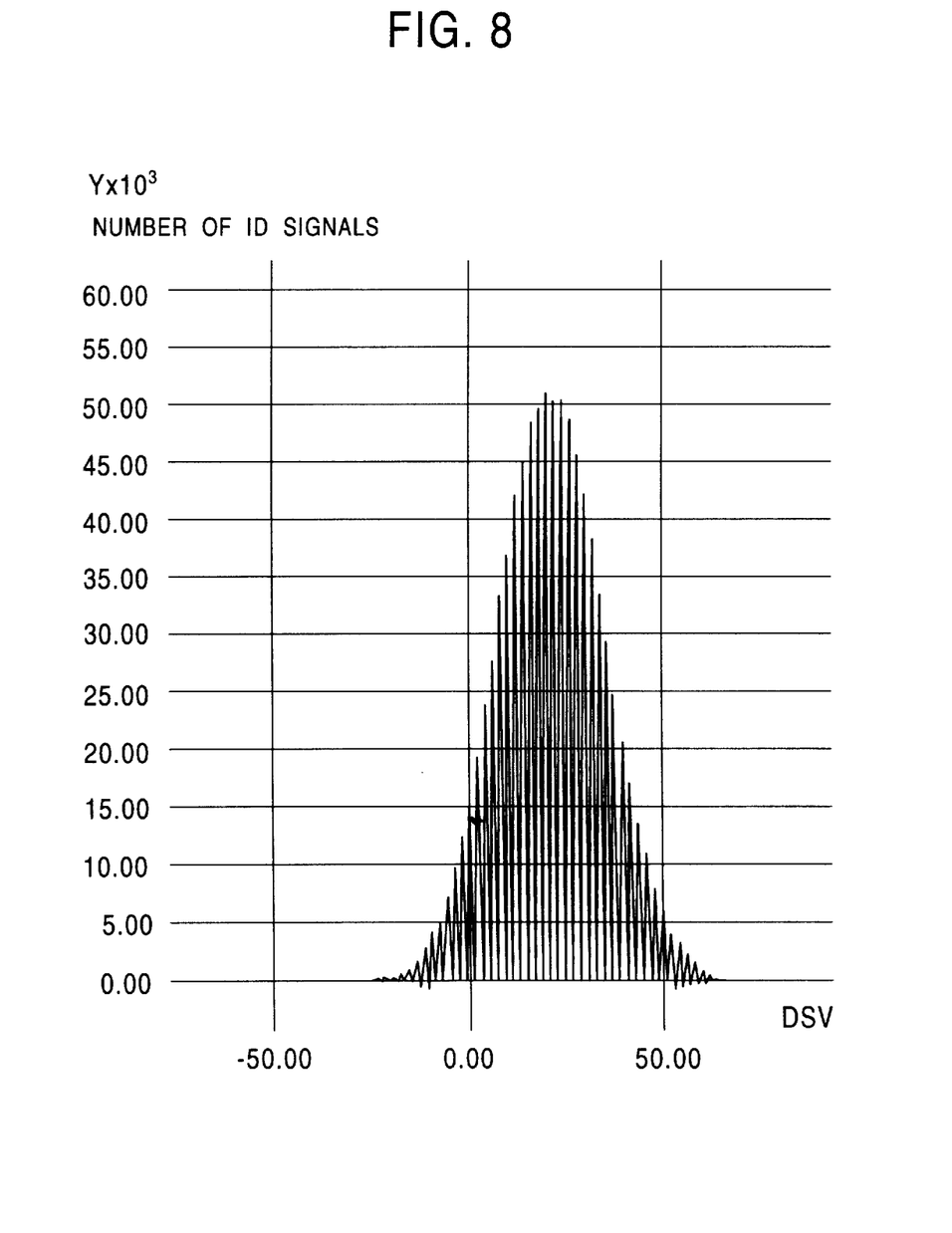
FIG. 8 is a characteristics curve showing the distribution of DSV obtained when ID signals are directly recorded, compared with that shown in FIG. 7.

With this method, DSV distribution can be converged in the vicinity of zero for the ID signals for the whole magneto-optical disk 2 as shown in FIG. 7. This means that the average DC level of the reproduction signals is converged in the vicinity of the zero level. FIG. 8 shows DSV distribution obtained when ID signals are stored as is, for the comparison with the distribution shown in FIG. 7. When ID signals are stored as is, wider DSV distribution than that obtained in the embodiment is acquired. The DSV distributions shown in FIGS. 7 and 8 are the results of simulation in which the sectors having sector numbers of 0h to 29h are repeatedly used in the range of track numbers from 0000h to 525Eh. The horizontal axis indicates a DSV and the vertical axis indicates the number of ID signals having each DSV.

As described above, in the reproduction system of the optical-disk apparatus 1, the AC component is extracted from a reproduction signal, and a simple step is performed in which the component is only binarized with a slice level set to the zero level, enabling ID signals to be reproduced with a substantially sufficient phase margin compared with that in the conventional apparatus. Identification signals of this kind can be reproduced easily and positively.

Also in this embodiment, even when the second ID signal is inverted and recorded, the ID signal can be reproduced without switching the operation of the reproduction system, due to the use of the NRZI modulation method, enabling identification signals of this kind to be reproduced positively with a simple configuration.

Recording System for ID Signals

The magneto-optical disk 2 is formed from a stamper which is produced from the original plate made in a mastering apparatus. ID signals are stored in the original plate in the mastering apparatus, and stored in the magneto-optical disk 2 in preformatting. Therefore, inversion of an ID signal level is executed in generating record signal REC in a mastering apparatus 40 shown in FIG. 1.

Figure 1:
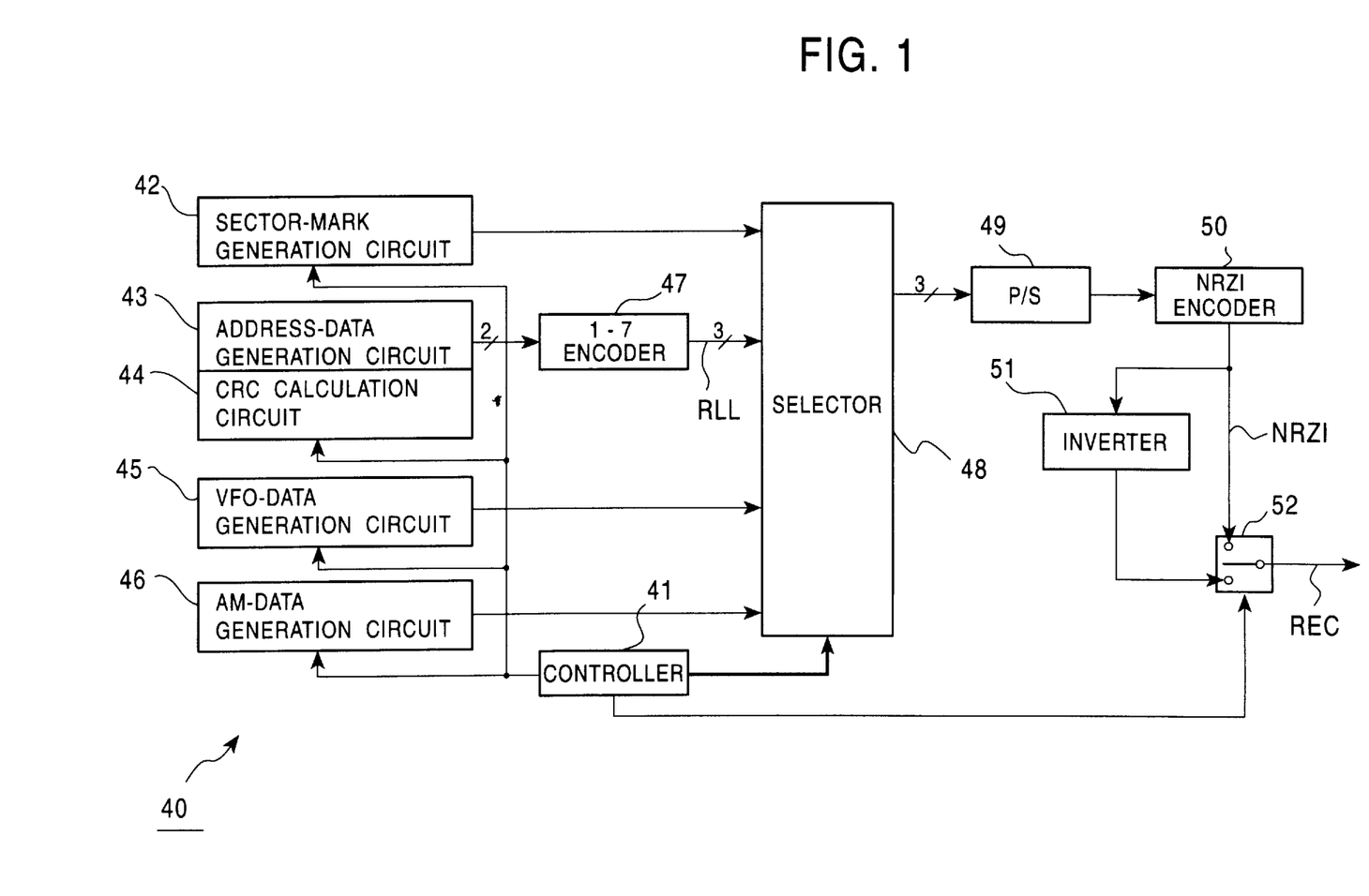
FIG. 1 is a block diagram showing a magneto-optical-disk mastering apparatus according to an embodiment of the present invention.

Rotating an original plate made of a glass substrate or other members at the specified rotation speed, the mastering apparatus 40 emits a laser beam to the original plate and moves the laser beam from the inner peripheral to the outer peripheral at the specified feed speed. The mastering apparatus 40 modulates the laser beam with record signal REC and exposes the original plate to the laser beam.

A controller 41 controls the whole operation according to the position to which the laser beam is emitted while the controller monitors the rotation of the original plate and the feed amount of the laser beam. The controller 41 outputs control data to a sector-mark generation circuit 42, and outputs the sector mark from the sector-mark generation circuit 42 at the timing when the sector-mark recording position is scanned with the laser beam. In the same way, the controller 41 outputs control data to an address-data generation circuit 43 and outputs a track number, an ID number, and a sector number from the address-data generation circuit at the timing when the ID-signal recording positions (ID1 to ID3) are scanned with the laser beam.

The address-data generation circuit 43 generates data such as a track number according to the positional information of the laser-beam-emitted position output from the controller 41. When the data such as a track number is generated, a CRC calculation circuit 44 calculates and outputs the corresponding CRC data.

The controller 41 outputs control data to a VFO-data generation circuit 45. The VFO-data generation circuit 45 outputs reference signals at the timing when the positions (VFO1 to VFO3) where the reference signals are recorded are scanned with the laser beam. In the same way, the controller 41 outputs control data to an address-mark (AM) data generation circuit 46. The address-mark-data generation circuit 46 outputs address-mark data at the timing when the positions (AM1 to AM3) where the address-marks are recorded are scanned with the laser beam.

A 1–7 encoder 47 applies 1–7 modulation to the output data of the address-data generation circuit 43 and outputs the result. A selector 48 switches a contact under the control of the controller 41, and outputs sequentially selected data such as the output data of the sector-mark generation circuit 42 according to the configuration of the address section described in FIG. 4. A parallel-serial conversion circuit (P/S) 49 converts the data output from the selector 48 to serial data and outputs the result. An NRZI encoder 50 applies NRZI modulation to the output data of the parallel-serial conversion circuit 49 and outputs the result.

An inverter 51 generates the inverted signal of the output data NRZI of the NRZI encoder 50 and outputs the result. A selection circuit 52 switches the contact from that corresponding to the output data NRZI of the NRZI encoder 50 to that for the data output from the inverter 51 while the area where the second ID signal is recorded is scanned with the laser beam.

With this configuration, in a record signal REC obtained through the selection circuit 52, an ID signal sequentially switches according to the position where the laser beam is emitted on the original plate and the second ID signal is inverted. In the mastering apparatus 40, a laser beam is modulated with this record signal REC to record the record signal REC in the original plate to store signals such as ID signals.

Operations in the Embodiment

In the above-described configuration, the magneto-optical disk 2 is generated from the original plate, which is made in the mastering apparatus 40 shown in FIG. 1. In making the original plate, sector mark SM, reference signal VFO, and an address mark are output from the sector-mark generation circuit 42, the VFO-data generation circuit 45, and the address-mark-data generation circuit 46 at the timing corresponding to the exposed positions in the original plate respectively. These output data items are selected by the selector 48 and converted to serial data in the parallel-serial conversion circuit 49.

The address-data generation circuit 43 outputs address data comprising track numbers, ID numbers, and sector numbers together with CRC data. These data items are 1–7-modulated in the 1–7 encoder 47, sent to the parallel-serial conversion circuit 49 through the selector 48, and converted to serial data in the parallel-serial conversion circuit 49.

The serial data output from the parallel-serial conversion circuit 49 is NRZI-modulated by the NRZI encoder 50, and output through the selection circuit 52 as record signal REC. The inverted signal of the second ID signal is generated by the inverter 51 and output from the selection circuit 52 as a substitute for the corresponding output data of the NRZI encoder 50. Record signal REC is generated such that the average DC level of reproduction signals converges to the zero level with the inverted signal.

In the mastering apparatus 40, the laser beam is modulated with this record signal REC and the address section shown in FIG. 4 is recorded in the original plate. The magneto-optical disk 2 is made from the original plate such that the address section shown in FIG. 4 with the second ID signal being inverted is stored in the magneto-optical disk 2 in preformatting.

While the magneto-optical disk 2, shown in FIG. 2, is rotated at the specified rotation speed by the spindle motor 28, laser beam L is emitted to the magneto-optical disk 2 by the optical block 3. The light returned from the magneto-optical disk 2 is led to the fixed section 3A by the moving section 3B, is received by the light-receiving device 16 in the fixed section 3A, and is converted to reproduction signal RF.

As shown in FIG. 3, the frequency characteristics of this reproduction signal RF is compensated for by the equalizer 30. Then, the signal is converted to a binarized signal with the slice level being used as the reference in the comparator 31. From this binarized signal, a reproduction clock is generated by the PLL circuit 32. The binarized signal is converted to reproduction data with the reproduction clock being used as the reference.

Since the average DC level of the reproduction signal RF converges to the zero level with a part of the ID signals being inverted, the signal level of the binarized signal changes at the correct timing by extracting the AC component just by AC coupling and by binarizing the AC component with a fixed slice level. This reduces a jitter occurrance in the reproduction clock generated from the binarized signal and enables the reproduction data to be generated at a sufficient phase margin in the optical-disk apparatus 1.

The reproduction data is demodulated by the NRZI demodulation circuit, and is 1–7-demodulated by the 1–7 decoder 35. Then, address data is detected in the address decoder 36. In reproduction, the error-correction circuit 8 applies error-correction processing to image data obtained from the 1–7 decoder 35, at the specified sector with the address data being used as the reference and the image data is output to an external device. In recording, in the same way, image data which is 1–7-modulated is NRZI-modulated together with error-correction codes at the specified sector with the address data being used as the reference and is recorded in the desired sector.

Advantages in the Embodiment

With the above-described configuration, since a part of the repeatedly recorded ID signals which change their DC levels according to the positions where the signals are recorded or reproduced is inverted and recorded, the average DC level of reproduction signals RF approaches the zero level. In the reproduction system, ID signals and other signals can be reproduced correctly with a simple configuration in which reproduction signals are binarized just with a fixed slice level.

Other Embodiments

In the above-described embodiment, ID signals serving as the references in recording and reproduction are repeatedly stored (three times) and the second ID signal is inverted. In the present invention, the number of times ID signals are recorded can be changed as required, and the portion where the polarity is switched can be selected as desired. The portion where the polarity is switched may be sequentially changed in units of sectors or in units of tracks.

In the above-described embodiment, the polarity is switched in a part of the ID signals generated with NRZI modulation. The present invention can also apply to ID signals which are generated in various types of modulation methods as required. In some modulation methods, the polarity of a reproduction signal needs to be switched when the reproduction signal is demodulated, correspondingly to the switch of polarity in recording.

In the above-described embodiment, ID signals are recorded in preformatting in an optical-disk apparatus using a magneto-optical disk. The present invention can also be applied to a write-once optical disk and an optical-disk apparatus using the disk, and further, to various types of data recording apparatuses in which the frequency band of a reproduction signal distributes to nearly zero, and still further, to those data recording apparatuses having a format function.

Also in the above-described embodiment, image data is recorded and reproduced. The present invention can also be applied to optical-disk apparatuses which record and reproduce various types of data items.

According to the present invention, the average DC level of reproduction signals can converge to the vicinity of the zero level since the polarity of a part of the identification signals is inverted and recorded when the identification signals for sectors which serve as the reference signals are repeatedly recorded, enabling the recorded data to be positively reproduced with a simple configuration.

What is claimed is:

1. A data recording medium in which an area for recording data is divided into sub-areas in preformatting; and in each divided sub-area, an identification-signal recording region for recording an identification signal identifying said divided sub-area is formed and said identification signal is recorded in said preformatting in said identification-signal recording region in a plurality of times of repeated recording, and a region other than said identification-signal recording region is formed in said divided sub-area such that said data is recorded or reproduced;

said data recording medium having, in said identification-signal recording region, an inversion-recording zone wherein said identification signal is recorded with a polarity thereof being inverted in at least one of said plurality of times of repeated recording in order to reduce a sum of the DC levels of identification signals recorded in said plurality of times of repeated recording.

2. A data recording medium according to claim 1, wherein said identification signal comprises at least a first signal indicating the number of each recording in said plurality of times of repeated recording of said identification signal, a second signal identifying a position where said data is recorded in said divided sub-area or a position where data recorded in said divided sub-area is reproduced, and a third signal indicating check codes of said first signal and said second signal, and said first, second, and third signals are consecutively recorded in said identification-signal recording region other than said inversion-recording zone, and said first, second, and third signals are consecutively recorded with polarities thereof being inverted, in said inversion-recording zone.

3. A data recording medium according to claim 2, wherein said first signal and said second signal are digital data to which RLL(1, 7) modulation has been applied.

4. A data recording medium according to claim 1, wherein said identification-signal recording region having said inversion-recording zone has a lower digital sum value (DSV) than an identification-signal recording region having none of said inversion-recording zone.

5. A data recording medium according to claim 1, wherein said data recording medium comprises a circular recording medium, divided sub-areas comprise sectors formed radially from the center of said circular recording medium, and said identification signal includes a signal identifying a corresponding sector.

6. A data recording apparatus which divides an area for recording data in a data recording medium into sub-areas in preformatting; and in each divided sub-area, forms an identification-signal recording region for recording an identification signal identifying said divided sub-area and records said identification signal in said preformatting in said identification-signal recording region in a plurality of times of repeated recording, said data recording apparatus comprising:

signal generation means for generating at least a signal indicating the start of said divided sub-area, said identification signal, and a signal forming a clock for reproducing said identification signal;

signal arrangement means for arranging the outputs of said signal generation means in the order of recording said outputs into said data recording medium;

signal modulation means for modulating the output of said signal arrangement means to a signal suited for recording to said data recording medium;

polarity-inversion means for receiving the output of said signal modulation means and for selectively inverting the polarity of an identification signal to be recorded, in at least one of said plurality of times of repeated recording according to a control signal in order to reduce the sum of the DC levels of identification signals recorded in said plurality of times of repeated recording;

recording means for recording the output of said polarity-inversion means into said data recording medium; and control means for controlling said signal generation means and said signal arrangement means, and for forming said control signal which controls said polarity-inversion means.

7. A data recording apparatus according to claim 6, wherein the identification signal generated by said signal generation means comprises at least a first signal indicating the number of each recording in said plurality of times of repeated recording of said identification signal, a second signal identifying the position where said data is recorded in said divided sub-area or a position where data recorded in said divided sub-area is reproduced, and a third signal indicating check codes of said first signal and said second signal, and said polarity-inversion means inverts the polarities of said first, second, and third signals according to said control signal.

8. A data recording apparatus according to claim 6, wherein the identification signal recorded by said recording means in said identification-signal recording region of said data recording medium has a lower digital sum value (DSV) than said identification signal which is recorded without inverting the polarity thereof.

9. A data recording apparatus according to claim 6, wherein said data recording medium comprises a circular recording medium, divided sub-areas comprise sectors formed radially from the center of said circular recording medium, and the identification signal generated by said signal generation means includes a signal identifying a corresponding sector.

* * * * *